(12) United States Patent
Ko et al.

(10) Patent No.: US 12,706,302 B2
(45) Date of Patent: Aug. 11, 2026

(54) HIGH CAPACITY BLENDED ANODES FOR LI-ION BATTERIES

(71) Applicant: The Johns Hopkins University, Baltimore, MD (US)

(72) Inventors: Jesse S. Ko, Bethesda, MD (US); Konstantinos Gerasopoulos, Gambrills, MD (US); Matthew W. Logan, Columbia, MD (US)

(73) Assignee: The Johns Hopkins University, Baltimore, MD (US)

( * ) Notice: Subject to any disclaimer, the term of this patent is extended or adjusted under 35 U.S.C. 154(b) by 507 days.

(21) Appl. No.: 18/209,290

(22) Filed: Jun. 13, 2023

(65) Prior Publication Data

US 2023/0402584 A1 Dec. 14, 2023

Related U.S. Application Data

(60) Provisional application No. 63/351,899, filed on Jun. 14, 2022.

(51) Int. Cl.

| | |
|---|---|
| ***H01M 4/36*** | (2006.01) |
| ***H01M 4/131*** | (2010.01) |
| ***H01M 4/134*** | (2010.01) |
| ***H01M 4/38*** | (2006.01) |
| ***H01M 4/485*** | (2010.01) |

(Continued)

(52) U.S. Cl.

CPC ........... *H01M 4/364* (2013.01); *H01M 4/131* (2013.01); *H01M 4/134* (2013.01); *H01M 4/38* (2013.01); *H01M 4/387* (2013.01); *H01M 4/485* (2013.01); *H01M 10/0525* (2013.01); *H01M 2004/027* (2013.01)

(58) Field of Classification Search

CPC ...... H01M 4/364; H01M 4/131; H01M 4/134; H01M 4/38; H01M 4/387; H01M 4/485; H01M 10/0525; H01M 2004/027; Y02E 60/10

See application file for complete search history.

(56) References Cited

U.S. PATENT DOCUMENTS

2021/0234172 A1* 7/2021 Isojima ............... H01M 10/058
2022/0052329 A1* 2/2022 Gerasopoulos ........ C01G 33/00

(Continued)

FOREIGN PATENT DOCUMENTS

WO WO-2023152505 A1 * 8/2023 .......... H01M 10/054

OTHER PUBLICATIONS

Moolayadukkam, S.; Bopaiah, K.A.; Parakkandy, P.K.; Thomas, S. Antimony (Sb)-Based Anodes for Lithium-Ion Batteries: Recent Advances. Condens. Matter 2022, 7, 27 (Year: 2022).*

*Primary Examiner* — Mark Kopec
*Assistant Examiner* — Jaison P Thomas
(74) *Attorney, Agent, or Firm* — Sung T. Kim

(57) ABSTRACT

Disclosed herein is a battery anode compound including a metal oxide and a metal. Also disclosed herein is a method of providing a battery anode compound comprising synthesizing $AlNb_{11}O_{29}$ and combining $AlNb_{11}O_{29}$ and a metal. A Li-ion battery anode compound is also disclosed that includes a slurry comprising up to 70% $AlNb_{11}O_{29}$, up to 70% $Li_4Ti_5O_{12}$, and up to 70% of a metal, wherein the metal is any one of Sb or Sn.

18 Claims, 5 Drawing Sheets

(51) Int. Cl.
*H01M 10/0525* (2010.01)
*H01M 4/02* (2006.01)

(56) References Cited

U.S. PATENT DOCUMENTS

| | | | | |
|---|---|---|---|---|
| 2022/0380226 | A1* | 12/2022 | Groombridge ...... | C01G 41/006 |
| 2023/0231123 | A1* | 7/2023 | Groombridge ..... | H01M 10/054<br>429/231.5 |

* cited by examiner

HIGH CAPACITY BLENDED ANODES FOR LI-ION BATTERIES

CROSS-REFERENCE TO RELATED APPLICATIONS

The present application claims priority to and filing benefit of U.S. Provisional Patent Application No. 63/351,899, filed on Jun. 14, 2022, which is incorporated herein by reference in its entirety.

BACKGROUND

Energy harvesting, energy consumption, and energy storage are a ubiquitous part of present day and future society. As the demand for energy consumption and harvesting increases, so does the need for high capacity energy storage.

SUMMARY

There exists a need for energy storage (e.g., power sources, particularly batteries) to be able to store increasing amounts of energy. In particular, batteries should be safe and able to hold a high capacity of energy.

In some embodiments of the present disclosure, described herein is a battery anode compound including a metal oxide and a metal. In some embodiments, the metal oxide can be an oxide of a Group IA-VB metal alloy, Group IA-IVB metal alloy, or Group IIIA-VB metal alloy. For example, the metal oxide can be an oxide of $Nb_2O_5$, $AlNb_{11}O_{29}$, or $Li_4Ti_5O_{12}$.

In other embodiments, the metal can be a Group IVA or a Group VA metal (e.g., tin (Sn) or antimony (Sb)).

In some embodiments, the anode material can include up to 70% metal oxide and up to 30% metal (e.g., up to about 70% metal oxide and up to about 30% Sn or Sb).

In some embodiments, the anode material described herein can be used to provide a battery having a specific capacity ranging from about 200 mAh/g to about 600 mAh/g.

In some embodiments of the present disclosure, also described herein is a method of providing a battery anode compound including synthesizing $AlNb_{11}O_{29}$ and combining $AlNb_{11}O_{29}$ and/or $Li_4Ti_5O_{12}$ with a metal. For example, the combining operation includes mixing up to 70% $AlNb_{11}O_{29}$ or $Li_4Ti_5O_{12}$ with up to 30% of the metal (e.g., Sn or Sb).

In some embodiments, the method can also include creating a slurry comprising the $AlNb_{11}O_{29}$ or $Li_4Ti_5O_{12}$ and the metal (e.g., Sn or Sb).

In some embodiments of the present disclosure, further described herein is a Li-ion battery anode compound including a slurry including up to about 70% $AlNb_{11}O_{29}$, up to about 70% $Li_4Ti_5O_{12}$, and up to about 70% of a metal, wherein the metal is any one of Sb or Sn.

Covered embodiments of the invention are defined by the claims, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

BRIEF DESCRIPTION OF THE DRAWINGS

The accompanying drawings are incorporated herein and form a part of the specification.

In the drawings, like reference numbers generally indicate identical or similar elements.

DETAILED DESCRIPTION

Figure 1:
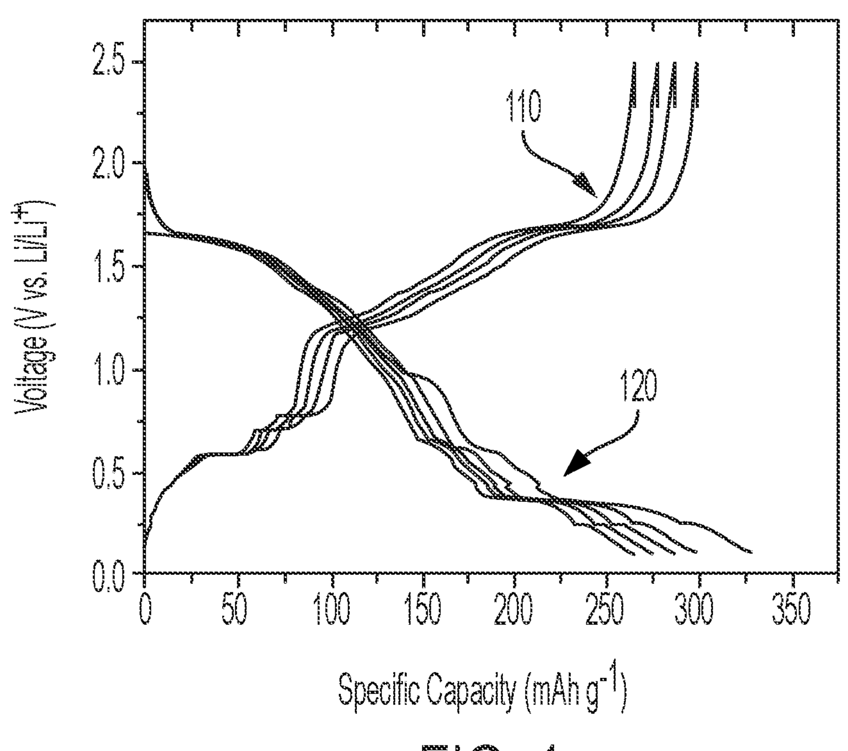
FIG. 1 shows specific capacity test results of a coin cell battery according to some embodiments of the present disclosure.

As used herein, the meaning of "a," "an," and "the" includes singular and plural references unless the context clearly dictates otherwise.

As used herein, the meaning of "room temperature" or can include a temperature of from about 15° C. to about 30° C., for example about 15° C., about 16° C., about 17° C., about 18° C., about 19° C., about 20° C., about 21° C., about 22° C., about 23° C., about 24° C., about 25° C., about 26° C., about 27° C., about 28° C., about 29° C., or about 30° C.

All ranges disclosed herein are to be understood to encompass any and all endpoints as well as any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10.

The term "and/or" when used in a list of two or more items, means that any one of the listed items can be employed by itself or in combination with any one or more of the listed items. For example, the expression "A and/or B" is intended to mean either or both of A and B, i.e., A alone, B alone, or A and B in combination. The expression "A, B and/or C" is intended to mean A alone, B alone, C alone, A and B in combination, A and C in combination, B and C in combination or A, B, and C in combination.

The present disclosure is directed to battery anode materials. In certain embodiments, the battery anode material can have a significant impact on the storage capacity and safety of the battery. For example, oxide-based anode materials used in a lithium-ion (Li-ion) battery can provide a relatively high specific capacity (e.g., at least 200 milliAmpere hours per gram (mAh/g)) at a potential that is higher than a potential leading to lithium plating, which in turn creates a safer battery. Additionally, metal-based anode materials can provide a very high specific capacity (e.g., greater than 600 mAh/g), but the metal anode materials may significantly contribute to battery degradation and can exhibit a very short life cycle (e.g., about 50 charge-discharge cycles). Further, carbon-based anode materials (e.g., graphite, or the like) can provide high specific capacities (e.g., about 300 mAh/g), however the carbon-based materials can contribute to lithium plating when high charging rates are used.

In certain embodiments, a blended anode material is described herein. For example, a Li-ion battery anode material can include an oxide-based material and a metal. In some embodiments of the present disclosure, the oxide material can be an oxide of a first or second row transition metal. For example, the oxide can be an oxide of Niobium, (Nb), Titanium (Ti), or Molybdenum (Mo).

In some embodiments, the oxide material can be an oxide of a Group IIIA-VB metal, Group IA-VB metal alloy, and/or a Group IA-IVB metal alloy. For example, the Group IIIA-VB metal alloy can be an alloy of aluminum and niobium, for example, aluminum niobate ($AlNb_{11}O_{29}$) and the group IA-IVB metal alloy can be an alloy of lithium and titanium, for example, lithium titanium oxide. In some embodiments the oxide is $AlNb_{11}O_{29}$ ("ANO") or $Li_4Ti_5O_{12}$ ("LTO").

ANO and/or LTO can be incorporated into a Li-ion battery architecture to provide a rechargeable Li-ion battery having a specific capacity of about 200 mAh/g (ANO) and about 155 mAh/g (LTO). As used herein, a battery's specific capacity is the amount of current drawn from the battery while the battery is subjected to a specific load until the battery's voltage reaches a predetermined minimum. As such, a 200 mAh/g specific capacity indicates the battery can supply 200 mA of current for 1 hour per gram of storage material, for example, per gram of ANO used as the anode material of a battery.

As noted above, the anode material described herein can include blended materials, e.g., an oxide and a metal. In some embodiments, the metal can be a Group IVA metal or a Group VA metal. For example, the metal can be Germanium (Ge), Tin (Sn), Lead (Pb), Arsenic (As), Antimony (Sb), or Bismuth (Bi).

In some embodiments, the blended anode material can include up to about 95% oxide-based material based on weight (w/w). For example, the blended anode material can include about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, or about 95% oxide-based material.

Likewise, in some embodiments the blended anode material can include up to about 70% metal. For example, the blended anode material can include about 5%, about 10%, about 15%, about 20%, about 25%, about 30%, about 35%, about 40%, about 45%, about 50%, about 55%, about 60%, about 65%, or about 70% metal.

Additionally, the blended anode material can be expressed as a ratio of oxide-based material to metal. In some embodiments, the blended anode material can include a ratio of the oxide-based material to the metal of about 80:20. For example, the ratio of oxide-based material to metal can be about 5:95, about 10:90, about 15:85, about 20:80, about 25:75, about 30:70, about 35:65, about 40:60, about 45:55, about 50:50, about 55:45, about 60:40, about 65:35, about 70:30, about 75:25, about 76:24, about 77:23, about 78:22, about 79:21, about 80:20, about 81:19, about 82:18, about 83:17, about 84:16, about 85:15 about 90:10, or about 95:5.

In some embodiments, the blended anode material can include ANO and Sn ($AlNb_{11}O_{29}$:Sn) in a ratio of about 5:95, about 10:90, about 15:85, about 20:80, about 25:75, about 30:70, about 35:65, about 40:60, about 45:55, about 50:50, about 55:45, about 60:40, about 65:35, about 70:30, about 75:25, about 76:24, about 77:23, about 78:22, about 79:21, about 80:20, about 81:19, about 82:18, about 83:17, about 84:16, about 85:15 about 90:10, or about 95:5.

In some embodiments, the blended anode material can include ANO and Sb ($AlNb_{11}O_{29}$:Sb) in a ratio of about 5:95, about 10:90, about 15:85, about 20:80, about 25:75, about 30:70, about 35:65, about 40:60, about 45:55, about 50:50, about 55:45, about 60:40, about 65:35, about 70:30, about 75:25, about 76:24, about 77:23, about 78:22, about 79:21, about 80:20, about 81:19, about 82:18, about 83:17, about 84:16, about 85:15 about 90:10, or about 95:5.

In some embodiments, the blended anode material can include LTO and Sn ($Li_4Ti_5O_{12}$:Sn) in a ratio of about 5:95, about 10:90, about 15:85, about 20:80, about 25:75, about 30:70, about 35:65, about 40:60, about 45:55, about 50:50, about 55:45, about 60:40, about 65:35, about 70:30, about 75:25, about 76:24, about 77:23, about 78:22, about 79:21, about 80:20, about 81:19, about 82:18, about 83:17, about 84:16, about 85:15 about 90:10, or about 95:5.

In some embodiments, the blended anode material can include LTO and Sb ($Li_4Ti_5O_{12}$:Sb) in a ratio of about 5:95, about 10:90, about 15:85, about 20:80, about 25:75, about 30:70, about 35:65, about 40:60, about 45:55, about 50:50, about 55:45, about 60:40, about 65:35, about 70:30, about 75:25, about 76:24, about 77:23, about 78:22, about 79:21, about 80:20, about 81:19, about 82:18, about 83:17, about 84:16, about 85:15 about 90:10, or about 95:5.

In certain embodiments of the present disclosure, the blended anode material, when incorporated into a Li-ion battery architecture, can provide a Li-ion battery having a specific capacity of at least 500 mAh/g. In some embodiments, the blended anode material described herein can be used to provide a Li-ion battery having a specific capacity of at least 600 mAh/g. For example, the blended anode materials described herein can be incorporated into a Li-ion battery that has a specific capacity of from about 200 mAh/g to about 600 mAh/g. For example, the specific capacity can range from about 200 mAh/g, about 225 mAh/g, about 250 mAh/g, about 275 mAh/g, 300 mAh/g, about 325 mAh/g, about 350 mAh/g, about 375 mAh/g, 400 mAh/g, about 425 mAh/g, about 450 mAh/g, about 475 mAh/g, 500 mAh/g, about 525 mAh/g, about 550 mAh/g, about 575 mAh/g, or about 600 mAh/g.

In certain embodiments, the device can be any suitable battery (e.g., a pouch cell, a prismatic cell, a button cell array, a paper battery, a printed battery, a textile battery, or the like). For example, the battery can be a flexible battery (e.g., a pouch cell battery, paper battery, printed battery, or textile battery) or an array of small scale (e.g., having a diameter up to about 10 mm) coin cell batteries. An array of coin cell batteries having diameters ranging from about 4 mm to about 10 mm can be incorporated into an elastomer lamina (e.g., coin cell batteries arranged in an array laminated with an elastomer) to provide e.g., a power patch. As such, the power patch can incorporate a network of leads connecting the coin cell batteries in series or in parallel. The leads can further be configured to extend beyond a boundary of the power patch (e.g., the elastomer lamina) enabling device connection.

In some examples, attaching a pair of leads to the device can be performed by soldering, welding, spot welding, twisting, applying a wire nut, or any combination thereof. Attaching at least one pair of leads to the device (e.g., the battery) enables an electrical connection to another device after the battery is encapsulated.

According to additional embodiments of the present disclosure, a method of providing the battery anode compound includes synthesizing $AlNb_{11}O_{29}$ (e.g., oxidized $Al_3Nb$) and combining $AlNb_{11}O_{29}$ (ANO) and a metal. The ANO synthesis is described in U.S. Patent Application Publication No. 2022/0052329 A1 to Gerasopoulos et al. and is incorporated herein by reference in its entirety.

In some embodiments, the method includes mixing up to about 70% metal oxide (e.g., $AlNb_{11}O_{29}$ or $Li_4Ti_5O_{12}$) with up to about 30% of the metal (e.g., Sb or Sn) to provide an active material (e.g., ANO:Sb, ANO:Sn, LTO:Sb, or LTO:Sn). In some embodiments, the method includes creating a slurry including the 70:30 metal oxide (e.g., $AlNb_{11}O_{29}$ and/or $Li_4Ti_5O_{12}$) and the metal (e.g., Sb or Sn). The slurry can also include carbon black (C65), carboxymethyl cellulose (CMC), and styrene butadiene rubber (SBR) binder materials. In some embodiments, the slurry can be a compound having a ratio of about 89:7:2:2 (active material:C65:CMC:SBR). In some examples, forming an anode includes depositing the slurry onto a copper (Cu) foil current collector or an aluminum (Al) foil current collector.

In certain examples, battery fabrication can include forming a coin cell battery. In some embodiments, the slurry-coated Cu foil or Al foil current collector is punched to a 10 mm circle and placed into a top portion of the coin cell. A 10 mm circle can be punched from a Li ribbon and placed in the bottom portion of the coin cell. In some embodiments, the electrolyte solution can be lithium hexafluorophosphate solution in ethylene carbonate and dimethyl carbonate, e.g., 1.0 M $LiPF_6$ in EC/DMC in a volume ratio of about 30:70 v/v. The electrolyte solution can be filled into the bottom portion of the coin cell. A polymer separator can be placed into the bottom portion of the coin cell to prevent a short-circuit when the coin cell is closed. Closing the coin cell can include placing the top portion of the coin cell onto the polymer spacer and crimping the coin cell together. The specific capacity of the coin cell battery can be tested under a series of imposed current draws to assess power, energy, and cycle life.

FIG. 1 is a graph showing exemplary specific capacity test results obtained of ANO:Sn during charge-discharge testing, according to some embodiments. In some embodiments, the active material loading in the coin cell battery was 1.72 mg of active material (e.g., 2.19 mg/cm$^2$). The voltage window for the charge-discharge cycling was 0.1 V-2.5 V vs Li/Li$^+$. The coin cell battery was cycled 5 times. Voltage as a function of specific capacity during the charge cycle is shown as the ascending curves 110. Voltage as a function of specific capacity during the discharge cycle is shown as descending curves 120. As shown in FIG. 1, the specific capacity (mAh/g) slightly decreases during cycle testing.

Figure 2:
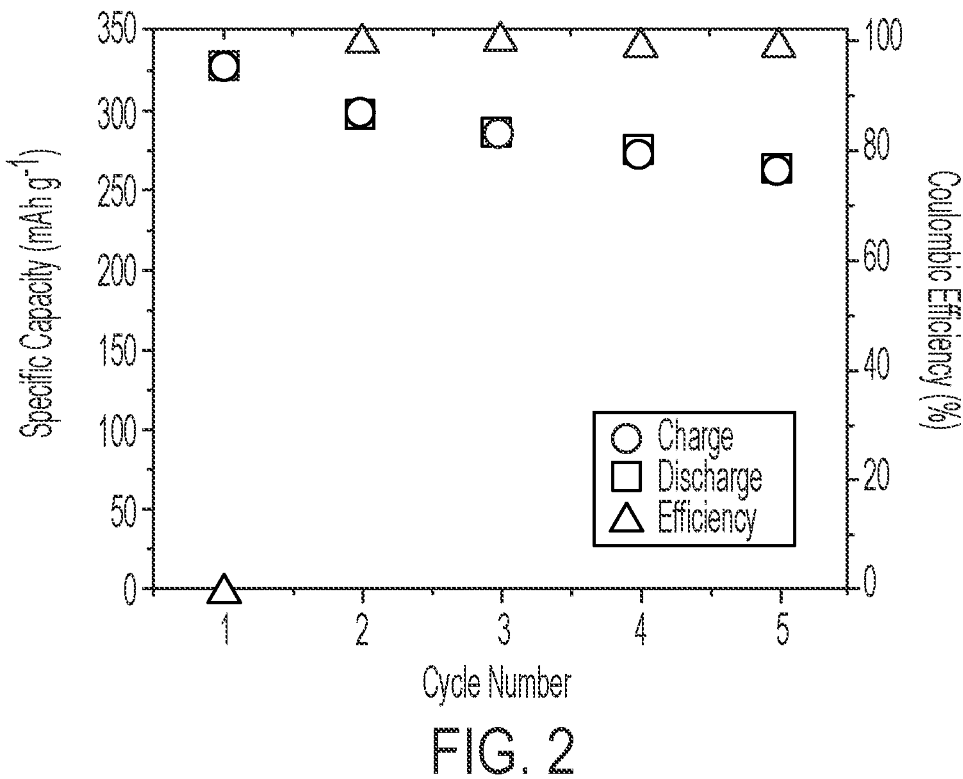
FIG. 2 shows specific capacity test and Coulombic efficiency results of a coin cell battery according to some embodiments of the present disclosure.

FIG. 2 is a graph showing exemplary specific capacity (indicated by open circles (charge) and open squares (discharge) in FIG. 2) and Coulombic efficiency (indicated as triangles in FIG. 2) per test cycle test results of the coin cell battery subjected to the exemplary charge-discharge cycling of FIG. 1, according to some embodiments. As shown in the graph, the Coulombic efficiency remains at about 100% during the 5 charge-discharge cycles. The specific capacity does decrease during the charge-discharge cycles, but as noted, the Coulombic efficiency remains at about 100%. Table 1 below shows the charge-discharge and Coulombic efficiency test results.

TABLE 1

| Cycle Number | Charge Specific Capacity (mAh/g) | Discharge Specific Capacity (mAh/g) | Coulombic Efficiency (%) |
|---|---|---|---|
| 1 | 0 | 329.4 | 0 |
| 2 | 298.7 | 298.8 | 100.05 |
| 3 | 286 | 286.3 | 100.09 |
| 4 | 277.4 | 275.6 | 99.36 |
| 5 | 265 | 264.4 | 99.8 |

Figure 3:
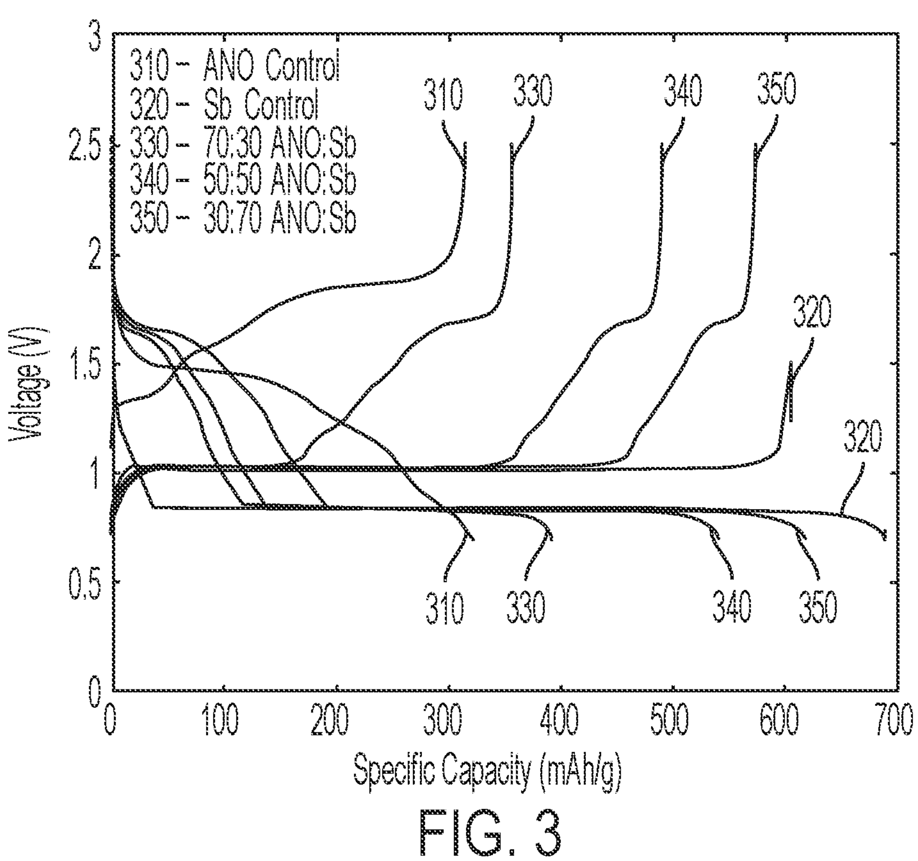
FIG. 3 shows specific capacity test results of a coin cell battery having varied anode material concentrations according to some embodiments of the present disclosure.

FIG. 3 is a graph showing exemplary specific capacity test results obtained during charge-discharge testing, according to some embodiments. In some embodiments, the active material mixture in the coin cell battery was varied. Two control cells were fabricated, one having an anode including only ANO as the active material in the coin cell anode (referred to as "ANO Control" in FIG. 3 and curves 310), and one having only Sb as the active material in the coin cell anode (referred to as "Sb Control" in FIG. 3 and curves 320). Additionally, exemplary test coin cells were provided including ANO and Sb in ratios of (ANO:Sb) 50:50 (curves 340), 70:30 (curves 330), and 30:70 (curves 350). As shown in FIG. 3, ANO:Sb composites show an increase in specific capacity with increasing Sb content.

Figure 4:
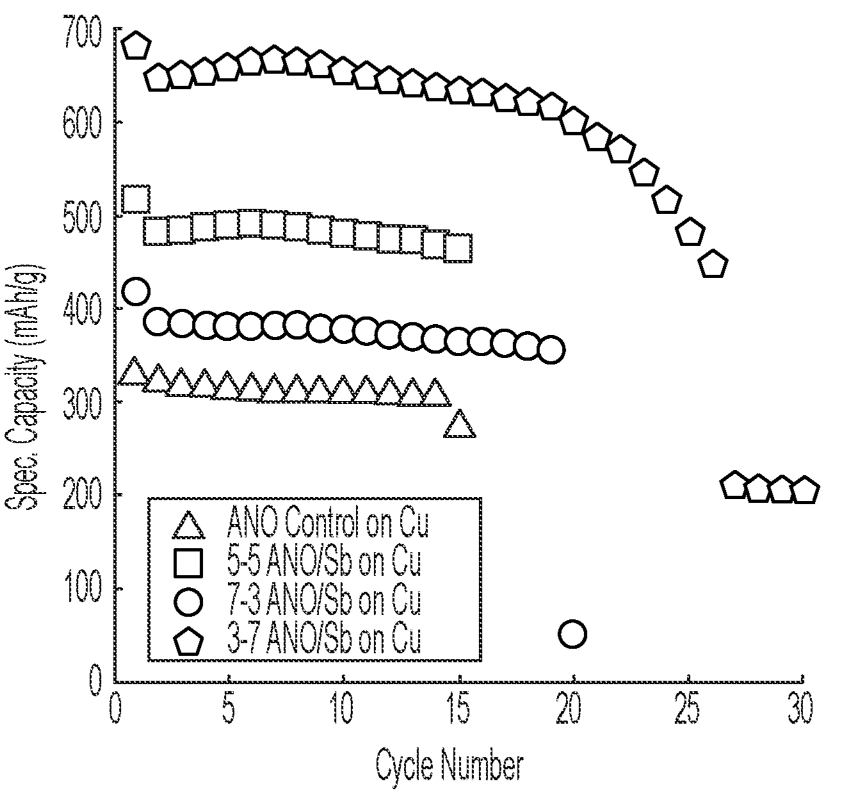
FIG. 4 shows specific capacity test results of a coin cell battery having varied anode material concentrations on copper foil according to some embodiments of the present disclosure.
Figures 5, 6:
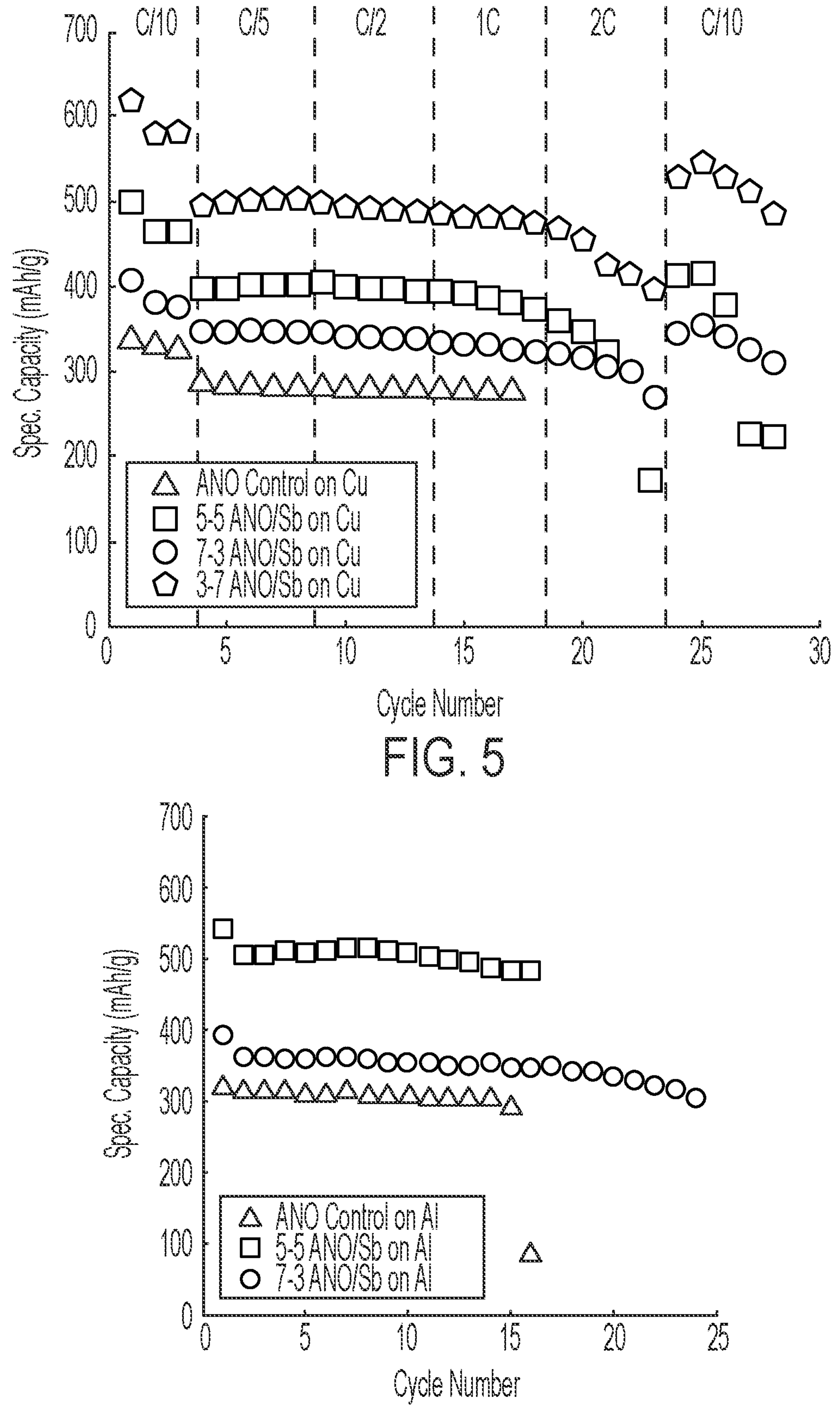
FIG. 5 shows specific capacity as a function of charge rate test results of a coin cell battery having varied anode material concentrations on copper foil according to some embodiments of the present disclosure.
FIG. 6 shows specific capacity test results of a coin cell battery having varied anode material concentrations on aluminum foil according to some embodiments of the present disclosure.
Figures 7, 8:
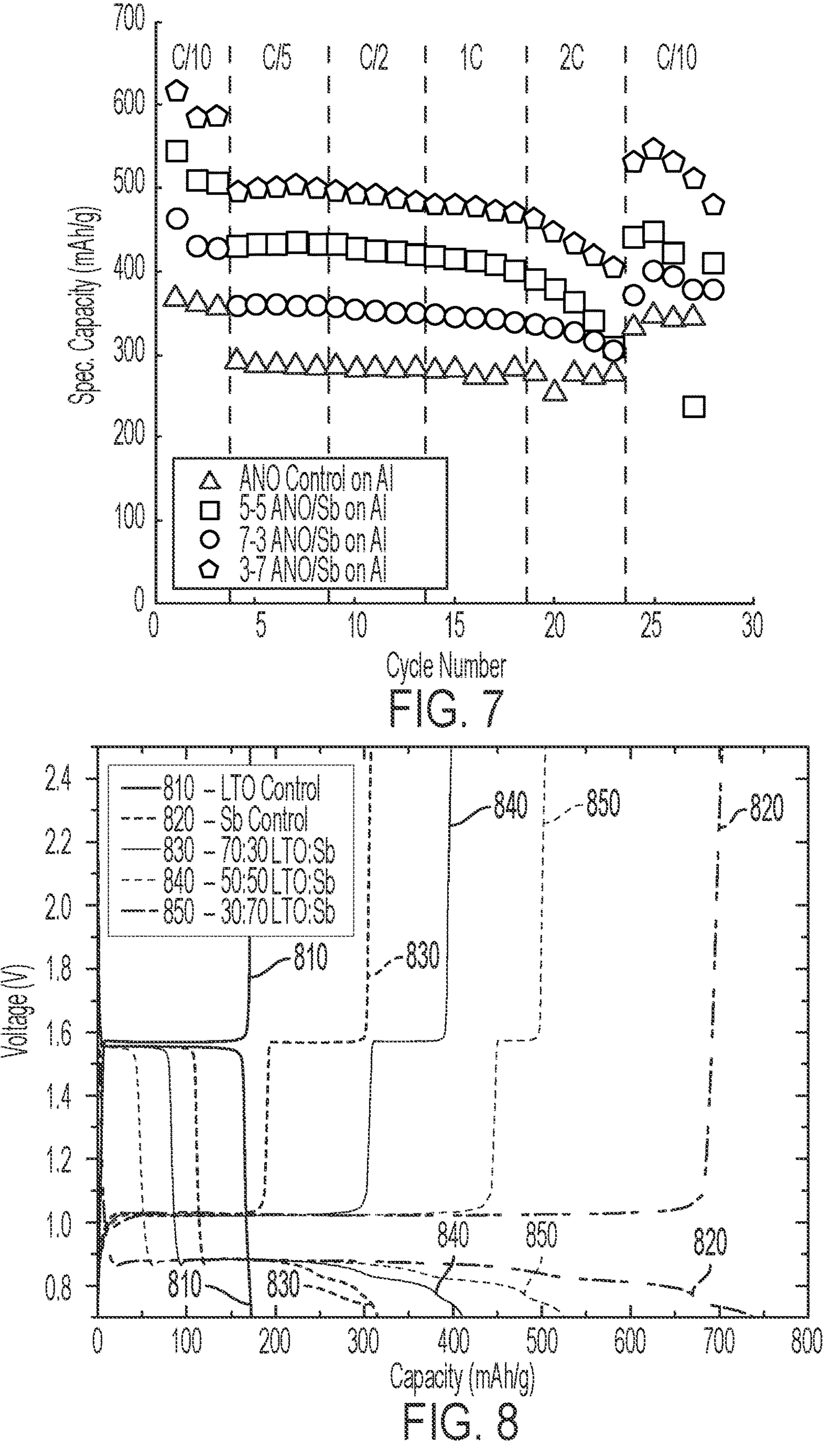
FIG. 7 shows specific capacity as a function of charge rate test results of a coin cell battery having varied anode material concentrations on aluminum foil according to some embodiments of the present disclosure.
FIG. 8 shows specific capacity test results of a coin cell battery having varied anode material concentrations according to some embodiments of the present disclosure.

FIGS. 4 and 5 are graphs showing exemplary specific capacity test results of a coin cell battery having varied anode material concentrations on copper foil, and specific capacity as a function of charge rate test results of a coin cell battery having varied anode material concentrations on copper foil, respectively, according to some embodiments. FIGS. 6 and 7 are graphs showing exemplary specific capacity test results of a coin cell battery having varied anode material concentrations on aluminum foil, and specific capacity as a function of charge rate test results of a coin cell battery having varied anode material concentrations on aluminum foil, respectively, according to some embodiments.

As shown in FIGS. 4-7, both Cu and Al current collectors are conducive for successful charge-discharge cycling. Also shown in FIGS. 4-7, within the first 15 cycles the anode provided having ANO:Sb with decreasing Sb content (e.g. 70:30 ANO:Sb) shows stable charge-discharge cycling. Further shown in FIGS. 4-7, a higher Sb content leads to a decrease in specific capacity beyond 20 charge-discharge cycles. The charge rate capability tests (FIGS. 5 and 7) demonstrate that the 2C charging rate can be achieved with ANO/Sb composites.

FIG. 8 is a graph showing exemplary specific capacity test results obtained during charge-discharge testing, according to some embodiments. In some embodiments, the active material mixture in the coin cell battery was varied. Two control cells were fabricated, one having an anode including only LTO as the active material in the coin cell anode (referred to as "LTO Control" in FIG. 8 and curves 810), and one having only Sb as the active material in the coin cell anode (referred to as "Sb Control" in FIG. 8 and curves 820).

Additionally, exemplary test coin cells were provided including LTO and Sb in ratios of (LTO:Sb) 50:50 (curves 840), 70:30 (curves 830), and 30:70 (curves 850). As shown in FIG. 8, LTO:Sb composites show an increase in specific capacity with increasing Sb content.

Figure 9:
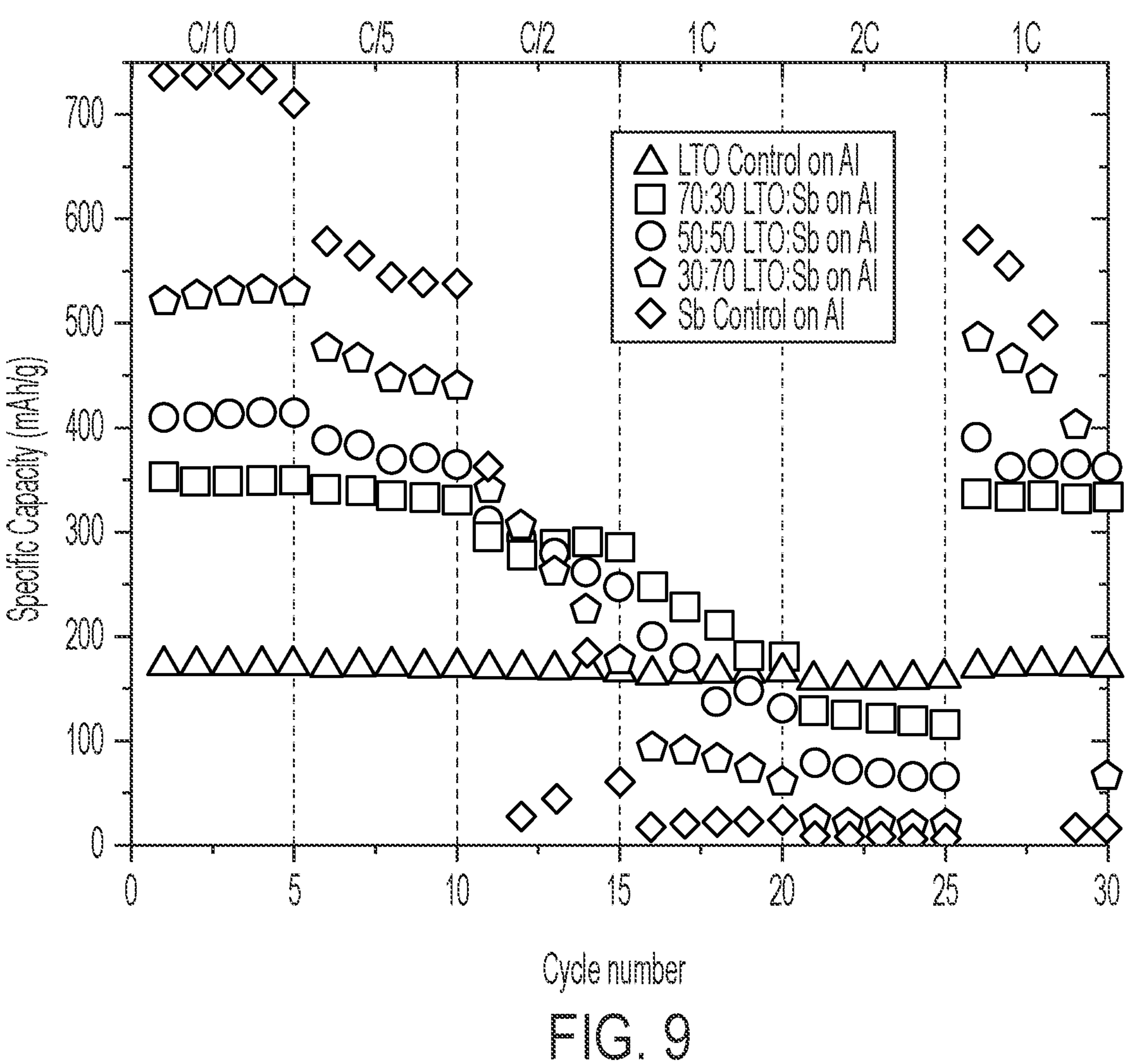
FIG. 9 shows specific capacity as a function of charge rate test results of a coin cell battery having varied anode material concentrations on aluminum foil according to some embodiments of the present disclosure.

FIG. 9 is a graph showing exemplary specific capacity test results of a coin cell battery having varied anode material concentrations on aluminum foil, and specific capacity as a function of charge rate test results of a coin cell battery having varied anode material concentrations on aluminum foil, respectively, according to some embodiments. A LTO: Sb composition of 70:30 exhibits an optimized combination of high specific capacity at low current draw and high capacity retention up to 2C.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A battery anode compound, comprising:

a metal oxide comprising greater than 0% by weight and less than or equal to 70% by weight of the battery anode compound; and a metal comprising at least one of a Group IVA metal and a Group VA metal, the metal comprising greater than 0% by weight and less than or equal to 70% by weight of the battery anode compound.

2. The battery anode compound of claim 1, wherein the metal oxide is an oxide of a Group IIIA-VB metal alloy.

3. The battery anode compound of claim 1, wherein the metal oxide is an oxide of a Group IA-IVB metal alloy.

4. The battery anode compound of claim 1, wherein the metal oxide is an oxide of a Group IA-VB metal alloy.

5. The battery anode compound of claim 1, wherein the metal oxide is $AlNb_{11}O_{29}$.

6. The battery anode compound of claim 1, wherein the metal is Sn.

7. The battery anode compound of claim 1, wherein the metal is Sb.

8. The battery anode compound of claim 1, wherein the metal oxide is $AlNb_{11}O_{29}$ and the metal is Sn.

9. The battery anode compound of claim 1, wherein the metal oxide is $AlNb_{11}O_{29}$ and the metal is Sb.

10. The battery anode compound of claim 1, wherein the metal oxide is $Li_4Ti_5O_{12}$ and the metal is Sb.

11. The battery anode compound of claim 1, wherein:

the metal oxide is $AlNb_{11}O_{29}$;

the metal is Sn; and the battery anode comprises up to 70% $AlNb_{11}O_{29}$ and up to 30% Sn.

12. The battery anode compound of claim 1, wherein:

the metal oxide is $AlNb_{11}O_{29}$;

the metal is Sb; and the battery anode comprises up to 70% $AlNb_{11}O_{29}$ and up to 30% Sb.

13. The battery anode compound of claim 1, wherein:

the metal oxide is $Li_4Ti_5O_{12}$;

the metal is Sb; and the battery anode comprises up to 70% $Li_4Ti_5O_{12}$ and up to 30% Sb.

14. The battery anode compound of claim 1, comprising a specific capacity of from 200 mAh/g to 600 mAh/g.

15. A method of providing a battery anode compound, comprising:

synthesizing $AlNb_{11}O_{29}$; and combining $AlNb_{11}O_{29}$ and a metal comprising at least one of a Group IVA metal and a Group VA metal.

16. The method of claim 15, further comprising combining $Li_4Ti_5O_{12}$ and the metal.

17. The method of claim 15, wherein;

the metal comprises Sn or Sb; and the combining comprises mixing up to 70% $AlNb_{11}O_{29}$ or $Li_4Ti_5O_{12}$ and up to 30% Sn or Sb.

18. A Li-ion battery anode compound, comprising:

a slurry comprising:

greater than 0% by weight and less than or equal to 70% by weight of $AlNb_{11}O_{29}$;

greater than 0% by weight and less than or equal to 70% by weight of $Li_4Ti_5O_{12}$; and greater than 0% by weight and less than or equal to 70% by weight of a metal, wherein the metal is any one of Sb or Sn.

* * * * *